United States Patent [19]
Saito et al.

[11] Patent Number: 6,000,021
[45] Date of Patent: Dec. 7, 1999

[54] APPARATUS AND METHOD FOR EXTENDING THE USEFUL LIFE OF A DATA STORAGE SYSTEM

[75] Inventors: Mitsuchika Saito; Takahiko Kamae, both of Kawasaki; Kiyoyuki Ihara, Yokohama, all of Japan

[73] Assignee: Hewlett-Packard Company, Palo Alto, Calif.

[21] Appl. No.: 08/808,951

[22] Filed: Feb. 19, 1997

[30] Foreign Application Priority Data

Feb. 23, 1996 [JP] Japan ................................ 8-061976

[51] Int. Cl.⁶ ............................. G06F 12/00; H01S 3/20
[52] U.S. Cl. ..................... 711/163; 711/154; 711/170; 711/207; 365/185.09; 365/200; 371/21.1; 371/53
[58] Field of Search ................... 711/170, 103, 711/113, 117, 770, 207, 154, 163; 395/182.04, 839; 365/185.09, 200; 371/53, 21.1

[56] References Cited

U.S. PATENT DOCUMENTS

| | | | |
|---|---|---|---|
| 4,833,595 | 5/1989 | Iijima | 711/770 |
| 4,841,498 | 6/1989 | Sugimura et al. | 369/32 |
| 4,916,603 | 4/1990 | Ryan et al. | 711/207 |
| 5,097,414 | 3/1992 | Tone | 711/117 |
| 5,164,577 | 11/1992 | Horie | 235/494 |
| 5,216,631 | 6/1993 | Sliwa, Jr. | 365/174 |
| 5,280,517 | 1/1994 | Matsumoto | 379/70 |
| 5,530,673 | 6/1996 | Tobita et al. | 365/185.09 |
| 5,586,290 | 12/1996 | Hirai et al. | 711/113 |
| 5,644,539 | 7/1997 | Yamagami et al. | 365/200 |
| 5,680,640 | 10/1997 | Otek et al. | 395/839 |
| 5,790,774 | 8/1998 | Sarkozy | 395/182.04 |
| 5,848,077 | 12/1998 | Kamae et al. | 371/53 |

FOREIGN PATENT DOCUMENTS

| | | | |
|---|---|---|---|
| 0522168A1 | 7/1992 | European Pat. Off. | H01J 37/30 |
| 0517074A2 | 12/1992 | European Pat. Off. | G11B 9/00 |
| 0723262A2 | 7/1996 | European Pat. Off. | G11B 9/00 |

*Primary Examiner*—Tuan V. Thai
*Attorney, Agent, or Firm*—Ian Hardcastle

[57] ABSTRACT

Useful life extension for a data storage system in which either or both of read/write probes and storage areas are components subject to wear caused by the access operations. An access counter counts an access count for each component subject to wear. A data exchange module operates in response to the access count for one of the components subject to wear reaching a first threshold to perform a data exchange in which data stored in a first storage area are exchanged with data stored is a second storage area. When the components subject to wear are the storage areas, the first storage area is the storage area whose access count reached the first threshold value, and the second storage area is a storage area whose access count is less than the first threshold value. When the components subject to wear are the read/write probes, the first storage area is the storage area accessed by the read/write probe whose access count reached the first threshold value, and the second storage area is a storage area accessed by a read/write probe whose access count is less than the first threshold value. An address conversion table rewriting module operates after each data exchange to rewrite part of an address conversion table to assign the physical addresses of the storage areas after the data exchange to logical addresses that correspond to the physical addresses of the storage areas before the data exchange.

19 Claims, 10 Drawing Sheets

6,000,021

APPARATUS AND METHOD FOR EXTENDING THE USEFUL LIFE OF A DATA STORAGE SYSTEM

FIELD OF THE INVENTION

The invention relates to a data storage system. In particular, the invention relates to a system and method for extending the useful life of a scanning-type mass data storage system.

BACKGROUND OF THE INVENTION

A hard magnetic disk drive (HDD) is often used as an auxiliary mass data storage device for a computer. Saitoh, Scanning Memory Device, Japanese patent application no. 6-270297 discloses a scanning-type data storage system that is used as a substitute mass data storage device for an HDD. Such mass data storage system occupies a much smaller volume than an HDD, while providing both significantly faster access speeds and higher storage densities.

A scanning-type data storage system reads or writes data by applying electrical stimuli to a data storage medium with a plural data read/write access probes. Both a read operation and a write operation performed by a probe constitute access operations. The useful life of this type of mass data storage system is limited by wear of the probes and the wear of storage medium. Thus, the number of access operations to the storage medium by the probe is limited by probe wear, and is also limited by wear of the storage medium.

In a scanning-type data storage system, the maximum number of access operations that each probe can perform is the same, and the maximum number of access operations that each storage area can receive is the same. However, the probes perform access operations different frequencies, and the storage areas receive access operations at different frequencies. For example, the data stored in some of the storage areas may be read much more frequently than the data stored in other storage areas, and the data stored in some of the storage areas may be rewritten much more frequently than the data stored in others of the storage areas.

Some probes perform many access operations and therefore reach their limit counts for access operations sooner than other probes. In contrast, because some probes perform few access operations, these probes can continue to be useful until reaching their limit counts for access operations, even if the access operations performed by other probes have reached their limit counts. Similarly, because some storage areas receive many access operations, they reach their limit counts for access operations sooner than other storage areas that receive few access operations. In contrast, some storage areas receive few access operations and can continue to be useful long after the storage areas that received many access operations have reached their limit counts for access operations.

A conventional scanning-type data storage system can therefore reach the end of its useful life and become useless, even though many probes and many storage areas have not reached their limit counts for the access operations. Thus, a conventional scanning-type data storage system can reach the end of its useful life without wearing out all of its probes or all of its storage areas.

In Saitoh, probes that have reached a predetermined number of access operations, i.e., their limit count, are considered to be unavailable, and the data in the storage area that is accessed by an invalid probe are transferred to a spare storage area. However, the spare storage areas are sometimes rapidly exhausted. The data storage system reaches the end of its useful life when all of the spare storage areas are used, and any probe again reaches the limit count for access operations.

While the prior-art provides some ways of extending the useful life of a data storage system, the prior art fails to provide ways to extend the useful life of the data storage system when the limits on the number of access operations of the probes and/or to the storage medium have been reached. The development of a system overcomes these limitations would constitute a major technological advance.

SUMMARY OF THE INVENTION

The invention provides an apparatus and method that can effectively extend the useful life of a data storage system, such as a scanning-type mass data storage system, beyond the limit count for access operations by the read/write probes and the limit count for access operations received by the storage medium.

A data storage system typically includes a storage medium divided into storage areas, and multiple read/write probes each of which performs access operations to read and write data in a respective storage area of the storage medium. Each access operation subjects either or both of the probe and the storage area to wear. Thus, either or both of the probe and the storage area are components subject to wear. The apparatus according to the invention includes a memory that stores an address conversion table that assigns physical addresses of the storage areas to logical addresses, an access counter that counts an access count for each of the components subject to wear, a data exchange module, and an address conversion table rewriting module. The data exchange module operates in response to the access count for one of the components subject to wear reaching a first threshold value. The data exchange module performs a data exchange operation in which data stored in a first storage area are exchanged with data stored is a second storage area. When the components subject to wear are the storage areas, the first storage area is the storage area whose access count reached the first threshold value, and the second storage area is a storage area whose access count is less than the first threshold value. When the components subject to wear are the read/write probes, the first storage area is the storage area accessed by the read/write probe whose access count reached the first threshold value, and the second storage area is the storage area accessed by a read/write probe whose access count is less than the first threshold value. The address conversion table rewriting module operates after each data exchange operation, and rewrites part of the address conversion table to assign the physical addresses of the second and first storage areas after the data exchange operation to logical addresses that correspond to the physical addresses of the first and second storage areas, respectively, before the data exchange operation.

When applied to a scanning-type data storage system, a first embodiment of the invention monitors the number of access operations performed by each of the probes, and a second embodiment monitors the number of access operations received by each storage area of the storage medium. The first and second embodiments include an address conversion table, access counters, a data exchange module, and an address conversion table rewriting module. The address conversion table, access counters, data exchange module and address conversion table rewriting module are preferably, but not necessarily, formed on a semiconductor substrate on which the probes are also located, or on which the storage medium is located, or on the circuit substrate provided in the package that houses the semiconductor substrate. Therefore, all of the structural elements of the apparatus can be installed on one card. In addition to the semiconductor substrate and the circuit substrate, referred to collectively as the substrates, all or a portion of the structural components of the apparatus, such as the counters, data exchange module, and address conversion table, can be installed, e.g., in the computer unit that uses the scanning-type mass data storage system to store data.

In the first embodiment the access counters are probe access counters each of which counts a probe access count. The probe access count is the number of probe access operations performed by the probe group to which the probe access counter belongs. In the second embodiment, the access counters are received access counters each of which counts a received access count. The received access count is the number of access operations received by the storage area to which the received access counter belongs. Each of the storage areas in the second embodiment is not necessarily the entire region of the storage medium covered by one probe group. It can be a so-called track, i.e., a storage area that is simultaneously accessed by one probe group in one access operation. Normally, the access counters count the number of accesses that have occurred in the time that has elapsed between an initialization time, for example, the time at which the mass storage system was manufactured, and the current time.

In both the first and second embodiments, the access counts are stored in predetermined storage areas provided in the storage medium, but they can also be stored in a non-volatile storage device other than the storage medium. For example, a non-volatile storage device such as an EEPROM formed on the substrate may be used.

In the first embodiment, the data exchange module exchanges the data stored in a storage area accessed by a probe group that has performed many access operations with the data stored in a storage area accessed by a probe group that has performed few access operations. In the second embodiment, the data exchange module exchanges the data stored in a storage area that has received many access operations with the data stored in a storage area that has received few access operations.

Normally, a processor formed on the substrate or the processor of the computer that uses the data storage system for storing data functions as the data exchange module and the address conversion table rewriting module. The data exchange operation can be performed when the number of access operations performed by a probe group or the number of access operations received by a storage area reaches a first threshold, to be described below, or can be performed at any convenient time after the number of access operations has reached the threshold.

In the first embodiment, the data exchange module monitors the number of access operations performed by each probe group to identify the probe groups that have performed many access operations compared with average probe groups, and to identify the probe groups that have performed few access operations compared with average probe groups. In the second embodiment, the data exchange module monitors the number of access operations received by each storage area to identify the storage areas that have received many access operations compared to average storage areas, and to identify the storage areas that have received few access operations compared to average storage areas. The data exchange module may operate in many different ways to identify the probe groups that have performed many access operations, the probe groups that have performed few access operations, the storage areas that have received many access operations, and the storage areas that have received few access operations. However, it is preferred that the data exchange module reference the probe access counts and the received access counts to perform such identification.

A first threshold is provided to determine which probe groups have performed many access operations and which storage areas have received many access operations. A second threshold, which is less than the first threshold, is provided to determine which probe groups have performed few access operations and which storage areas have received few access operations. For example, the first threshold can be a fixed percentage (for example, 80%) of the limit count for access operations; and the second threshold can be a different fixed percentage (for example, 20%) of the limit count for access operations. To extend the useful life of the data storage system more effectively, either or both of the first threshold and the second threshold may have multiple settings that are updated as the number of data exchanges increases.

After each data exchange operation, the address conversion table rewriting module updates the address conversion table so that the physical addresses of the storage areas after the exchange correspond to logical addresses that are the same as the physical address of the storage areas before the data exchange. Usually, the processor performs this function. The address conversion table is stored in a storage device, such as a certain area of the storage medium, or a non-volatile memory such as an EEPROM formed on a substrate. Alternatively, the address conversion table may be stored in a selected storage area of the storage medium when the data storage system is not in operation, and may be transferred from the selected storage area to a memory, such as a RAM or SRAM when the data storage system is in operation. As noted above, the address conversion table is updated after each data exchange operation. Prior to turning power off, the updated address conversion table is rewritten into the specific storage area of the storage medium. Transferring the address conversion table from the storage medium to an electronic memory during operation reduces wear of the probes and the storage medium, and increases the access speed to the address data when the data storage system is in operation.

The first and second embodiments can additionally include a total access number counters that respectively count the total number of access operations performed by all the probe groups and the total number of access operations received by all the storage areas of the storage medium. The total number of access operations performed is the sum of the probe access counts for all the probe groups of the data storage system. The total number of access operations received is the sum of the received access counts for all the storage areas of the storage medium. The counters may comprise a non-volatile memory such as an EEPROM provided on the substrate, or a specific storage area of the storage medium.

In the first embodiment, if the data storage system is used to replace a hard disk drive, the total access operations performed count indicating the total number of access operations performed is initially stored in a storage area of the storage medium. The total access operations performed count is transferred to an electronic total access operations performed memory from the storage area of the storage medium when the power to the data storage system is turned on. When the power is turned off, the updated total access operations performed count is transferred from the electronic total access operations performed memory back to the storage area provided in the storage medium.

In the second embodiment, a storage area located in the storage medium 2 stores a total access operations received count that indicates the total number of access operations received by the storage medium. The total access operations received count can be transferred between the storage medium and an electronic total access operations received memory in the same manner as described above.

The central processing unit (CPU) of the computer or another device, such as a peripheral device, can reference the total access operations performed memory or the total access operation received memory to monitor the total number of access operations. The central processing unit can then inform the user about the life of the data storage system using a display. This will be discussed further below.

In the apparatus and memory according to the invention, the data exchange module can also effectively substitute a spare storage area of the storage medium for a storage area that is accessed by a probe group whose probe access count reaches the limit count, or a storage area whose received access count reaches the limit count. Thus, even if some probe group or storage area reaches the end of its life and cannot be further used, this does not end the useful life of the data storage system. The apparatus and method according to the invention significantly extends the life of the data storage system by equalizing the number of access operations performed by each probe group and by equalizing the number of access operations received by each storage area.

In the method according to the invention for managing probe wear, i.e., the first embodiment, the number of access operations performed by each probe group is counted, the probe groups that have performed many access operations compared to average probe groups, and the probe groups that have performed few access operations compared to average probe groups are identified, the data stored in the storage area accessed by a probe group that has performed many access operations are exchanged with the data stored in a storage area accessed by a probe group that has performed few access operations, and the physical addresses of the storage areas, after the exchange, are assigned to logical addresses that correspond to the physical addresses of the storage areas before the exchange.

In the method according to the invention for managing the wear of the data storage medium, i.e., the second embodiment, the number of access operations received by the storage areas accessed by each probe group are counted, storage areas that have received many access operations compared with average storage areas and storage areas that have received few received access operations compared with average storage areas are identified, the data stored in a storage area that has received many access operations are exchanged with the data stored in a storage area that has received relatively few access operations, and the physical addresses of the storage areas, after the exchange, are assigned to logical addresses that correspond to the physical addresses of the storage areas before the exchange.

A device that displays the residual life of the data storage system informs the user of the residual life of the data storage system. Such a device may be provided in the first and second embodiments for each probe group or storage area in which the above access operations are performed. In one embodiment of such device, the data storage system may contain a display for displaying warnings. When the total number of access operations reaches a certain value, for example, a threshold set as a percentage of the limit count, the display issues a warning to the user of the device.

If the data storage system is included in a memory card, such as a PCMCIA card, it is desirable for the user to know the remaining useful life of the memory card. In this case, the device for displaying residual life can be visually checked by the user to determine the total number of access operations. Because the cumulative number of access operations only increases over time, and does not decrease, a method that increments a stored value provides a suitable display. The power supply at the unit, e.g., the computer, that uses a memory card may power such display. If batteries are used in the memory card, the display is preferably a low-power device, such as a liquid crystal display. The device for displaying residual life can be used alone or in combination with either or both of the first and second embodiments.

Because the address conversion table, the data exchange module and the address conversion table writing module are used in both embodiments, these elements can be shared between the embodiments. This conserves resources, and enables a smaller device be designed. The invention markedly increases the life of a data storage system that is affected by the wear of both the probe group and the storage medium. The device for displaying residual life uses the count of the total number of access operations. Because such an arrangement enables the apparatus and method according to the invention to provide resource savings and more compact equipment, the joint use of the first and second embodiments is seen as providing significant advantages.

Generally, if the storage medium loses data after being unused for some period of time, the data must be rewritten. The storage medium in some embodiments is of a type that can only save information for several days. Therefore, all of the data must be periodically refreshed. If the storage medium is a memory card, the memory card does not receive power from the peripheral equipment, a small battery and clock are built into the data storage system to enable all of the data to be periodically refreshed.

DETAILED DESCRIPTION OF THE INVENTION

Data Storage System

Figure 1A:
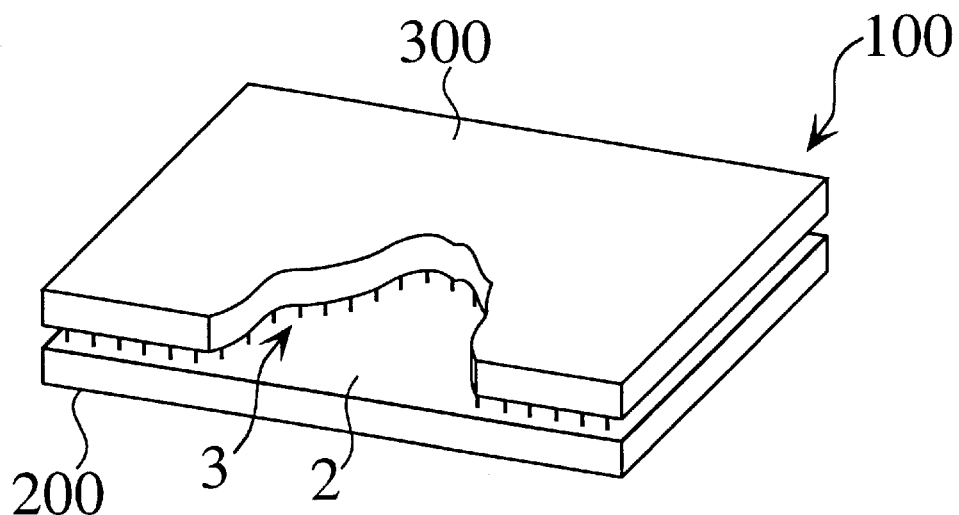
FIG. 1(A) shows a schematic portion of a data storage system to which the apparatus and method of the invention are applied.
Figure 1B:
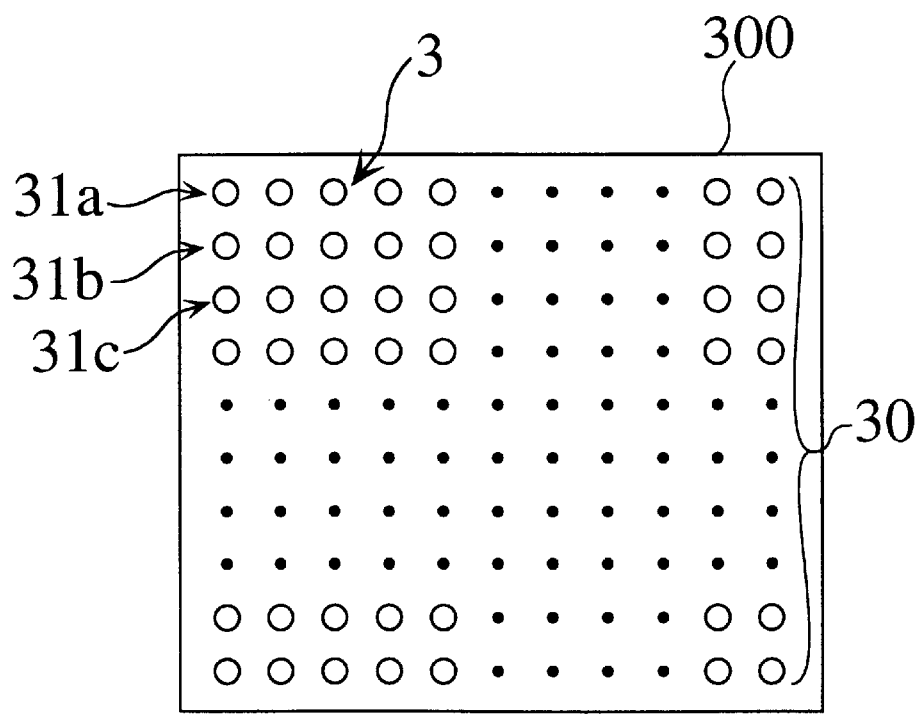
FIG. 1(B) shows the substrate where a probe group is formed in a data storage system to which the apparatus and method of the invention are applied.

FIGS. 1(A) and 1(B) show the data storage system 100 as an example of a data storage system whose useful life is extended by the apparatus and method according to the invention. The data storage system is constructed as shown in FIG. 1(A) by placing two substrates 200 and 300 opposite each other. The storage medium 2 is shown located on the substrate 200. Multiple probes 3 are located on the substrate 300. As shown on FIG. 1(B), the probes 3 form an array. A group of probes located in the same row constitutes a probe group 30. The reference numeral 30 will be used to refer to the probe groups in general, the reference numerals 31a, 31b, and 31c will be used to refer to specific probe groups used as examples. A semiconductor circuit (not shown on FIG. 1) is formed on the substrate 300.

The probes in a selected probe group read and write data in the storage medium 2 in the data storage system 100 by performing access operations. An access operation is a series of operations that includes bringing the probe tips of the probes in the probe group into contact with the surface of the storage medium 2, relative motion between the probe tips and the storage medium surface, and breaking the contact. Each probe in the same probe group, e.g., each probe in the probe group 31a, simultaneously accesses the storage medium 2. Each access operation subjects the probe group that performs the access operation and the storage area of the storage medium that receives the access operation to wear.

Figure 2:
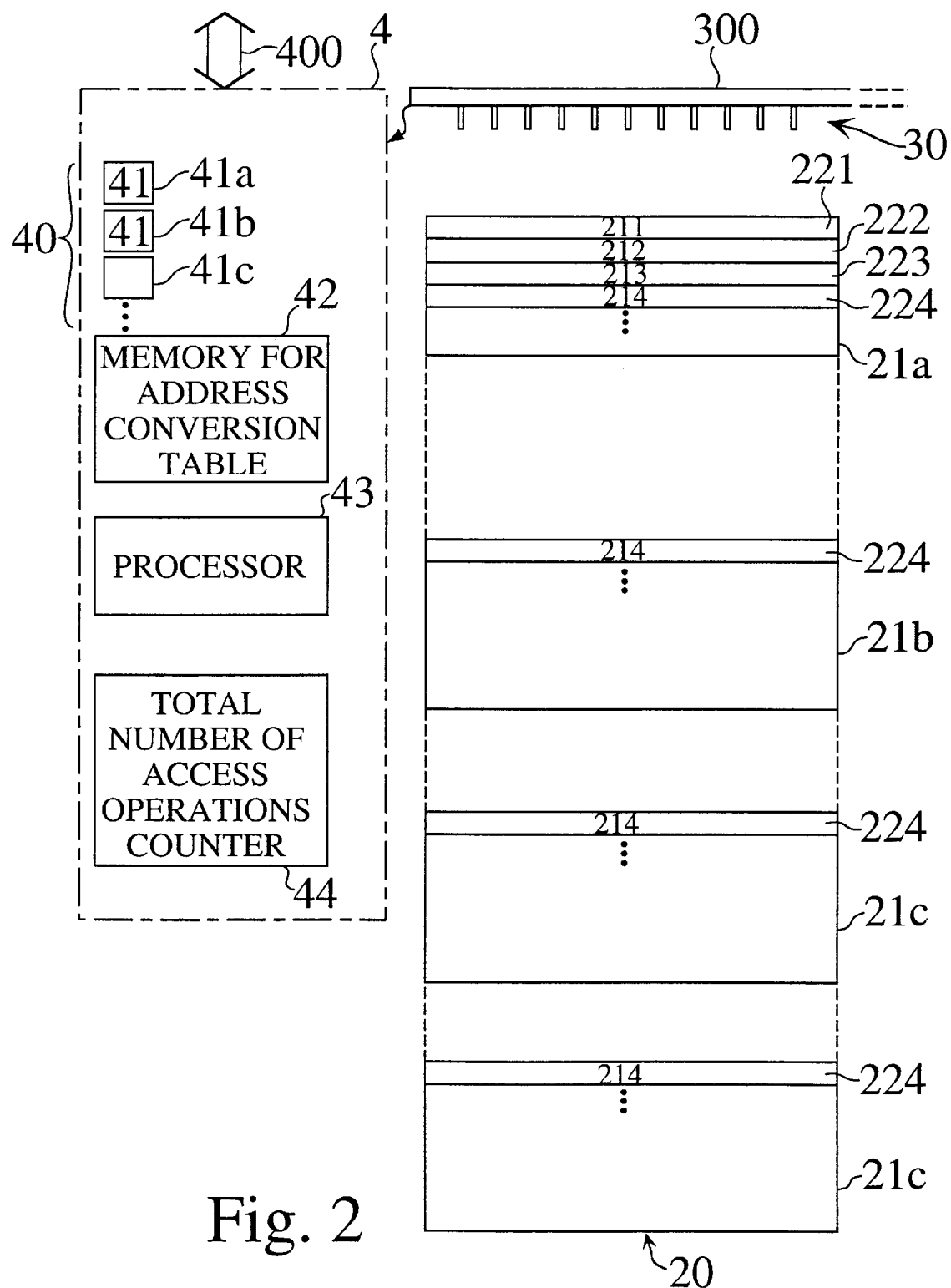
FIG. 2 shows the general relationships between each field and the probe group and the semiconductor circuit in a first embodiment of the invention.

FIG. 2 shows how the storage medium 2 is divided into storage areas, each of which is accessed by one of the probe groups 30. Such storage areas are called fields 20. The fields 21a, 21b and 21c are specific examples of the fields 20 located in the storage medium. The fields 21a, 21b and 21c are respectively accessed by the probe groups 31a, 31b and 31c.

Each field is subdivided into storage areas called tracks. Examples of tracks shown in FIG. 2 are indicated by the reference numerals 222, 223, 224. A track is the part of the field accessed by the probe group in one access operation.

As will be described in more detail below, fields are the storage areas between which data are exchanged in the first embodiment, and tracks are the storage areas between which data are exchanged in the second embodiment.

Depending on the type of storage medium 2, reading the data stored in the storage medium 2 may destroy the stored data, in which case, the read data are rewritten following each read operation.

The data storage device 100 is addressed using logical addresses. A logical address consists of a logical field address and a logical track address. An address conversion table, to be described below, assigns logical addresses in the system for which the data storage system 100 stores data to the physical addresses in the storage medium 2.

First Embodiment

FIGS. 2 to 6 refer to the first embodiment of the apparatus and method for extending the useful life of a data storage system. In this embodiment, the life of the data storage system is extended by considering only wear of the probes, and not wear of the storage medium. In other words, the probes are the components subject to wear in the first embodiment.

FIG. 2 shows the preferred arrangement of the semiconductor circuit 4, embodying the first embodiment of the invention, with the probe groups 30 and the fields 20 of the data storage system 100. The semiconductor circuit 4 includes the probe access counters 40 that count the number of access operations performed by the probe groups 30 to generate respective probe access counts, the memory 42 that stores the address conversion table, the processor 43, and the total access operations performed counter 44 that counts the total number of probe access operations performed by all the probe groups 30.

Each of the probe access counters 40 corresponds to one of the probe groups 30, and counts the probe access count for its probe group. The probe access count is the number of probe access operations performed by the probe group. For example, the probe access counter 41a counts the number of probe access operations performed by the probe group 31a to provide the probe access count for the probe group 31a. The total access operations performed counter 44 displays the total number of probe access operations performed by all of the probe groups 30 up to the present time. However, this feature is optional and can be omitted in some applications.

The processor 43 performs three main functions:

(1) Identifying the probe groups that have performed many access operations compared with average probe groups and identifying the probe groups that have performed few access operations compared with average probe groups;

(2) Exchanging the data stored in the field that is accessed by a probe group that has performed many access operations with the data stored in a field accessed by a probe group that has performed few access operations; and (3) Rewriting the address conversion table to assign the physical addresses of the fields after a data exchange to logical addresses that correspond to the physical addresses of the fields before the data exchange.

The time needed to monitor the probe access counts indicating the number of access operations performed by each of the probe groups 30 and the time needed to monitor the total number of access operations performed are markedly decreased by forming each of the elements described above in the semiconductor circuit 4. Because the useful life of the storage device 100 only depends on wear of the probes, the processor 43 does not consider wear of the storage medium 2 when monitoring the number of access operations, but only monitors the probe access counts indicating the number of access operations performed by each of the probe groups 30. The number of probe groups 30 is usually large, e.g., typically several hundred, but probe access counters 40 equal in number to the number of probe groups 30 can easily be fabricated on the semiconductor circuit 4. As described above, the processor 43 references the probe access count counted by each of the probe access counters 40 to identify the probe groups 30 that have performed an above-average number of access operations and the probe groups that have performed a below-average number of access operations.

The storage area 211 in the storage medium 2 for the field address conversion table, the storage area 212 for probe access counts, and the storage area 213 for the total number of access operations are located in the field 21a. The field 21a is the field at the lowest physical address. In this example, the field 21*a* is accessed by the probe group 31*a*. A storage area 214 for the track address conversion table is provided in each field. The field address conversion table stored in storage area 211 and the track address conversion table stored in storage area 214 collectively constitute the address conversion table. The storage area 211 is located in track 221, the storage area 212 in track 222, the storage area 213 in track 223, and storage area 214 in track 224.

The number of access operations performed by each of the probe groups 30 is counted by the respective probe access counter 40 and the resulting probe access counts are stored in a selected track of the field 21*a* accessed by the probe group 31*a*. If 30 bits are allocated for each probe access counter 40, and the data storage system 100 has 100 probe groups 30, the memory requirements for all the probe access counters 40 is only 3 kbits.

The size of memory 42 required to store the address conversion table is not an important consideration because the address conversion table is small. For example, if there are 100 probe groups 30, the size of the memory 42 is 1 kbits.

When a bad track is replaced by a good track, an operation that will be described below, the logical track address differs from the physical track address. Consequently, indirect addressing must be performed to access the data residing at the logical address of the bad track. It is preferred that the replacement track and the bad track be tracks within the same field so that only indirect track addressing need be performed. This significantly reduces the size of the memory 42 that stores the address conversion table.

After-Manufacture Initialization

After manufacture, a good/bad quality test is first performed on all of the tracks in each field and the number of bad tracks in each field is counted. A field in which the number of bad tracks exceeds a predetermined threshold (for example, 30 tracks) is considered to be a bad field. An entry is made in the field address conversion table to enable each bad field to be replaced by a good field. The field address conversion table is stored in the storage area 211 of the good field with the lowest physical address. If the storage area 211 is bad, the field 21*a* is regarded as a bad field, and a bad field indication is written into a flag field located in a specific area at the head of the field. This completes the post-manufacture processing related to field replacement.

For bad tracks within a good field, an entry is made in the track address conversion table that enables each bad track to be replaced by a good spare track in the same field. The field address conversion table for each field is stored in the storage area 214 of the field. When the storage area 214 of a field is bad, the field is deemed to be bad field, and processing similar to the replacement processing described above is performed on the field.

The data indicating the total number of access operations performed by each probe group and the total number of access operations that are stored in the storage area 212 and the storage area 213 are set to zero during the post-manufacture initialization.

Data Read/Write Operation

Figure 3:
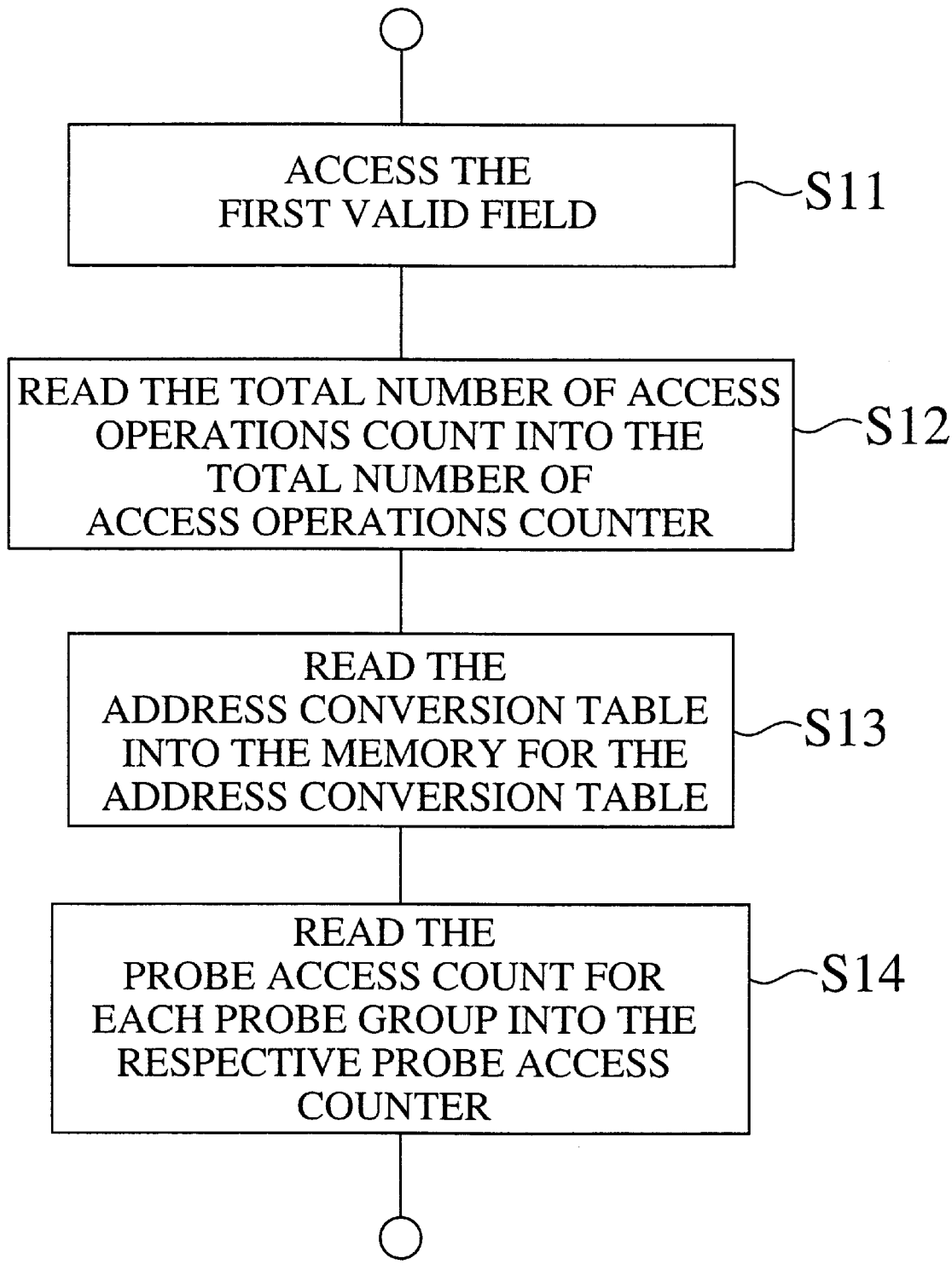
FIG. 3 is a flow chart that shows processing when the power is turned on in the first embodiment of the invention.

FIGS. 3 to 6 refer to the operation of the data storage system shown in FIGS. 1(A) and 1(B) that incorporates the first embodiment of the invention shown in FIG. 2. Steps S11 to S14 shown in FIG. 3 are executed each time the power is turned on. When the power is turned on, the valid field with the lowest physical address is accessed in step S11. In the example shown in FIG. 2, the valid field with the lowest physical address is the field 21*a*. This field is accessed by the probe group 31*a*. The data stored in storage area 213 indicating the total number of access operations are read into the total access operations counter performed in step S12. The field address conversion table stored in storage area 211 and the track address conversion table stored in each storage area 214 are read into the memory 42 in step S13. The probe access counts stored in the storage area 212 and indicating the number of access operations performed by each of the probe groups 30 are read into the respective probe access counters 40 in step S14. This ends the power-on sequence. The execution order of the steps is not necessarily restricted to the order shown in FIG. 3.

Figure 4:
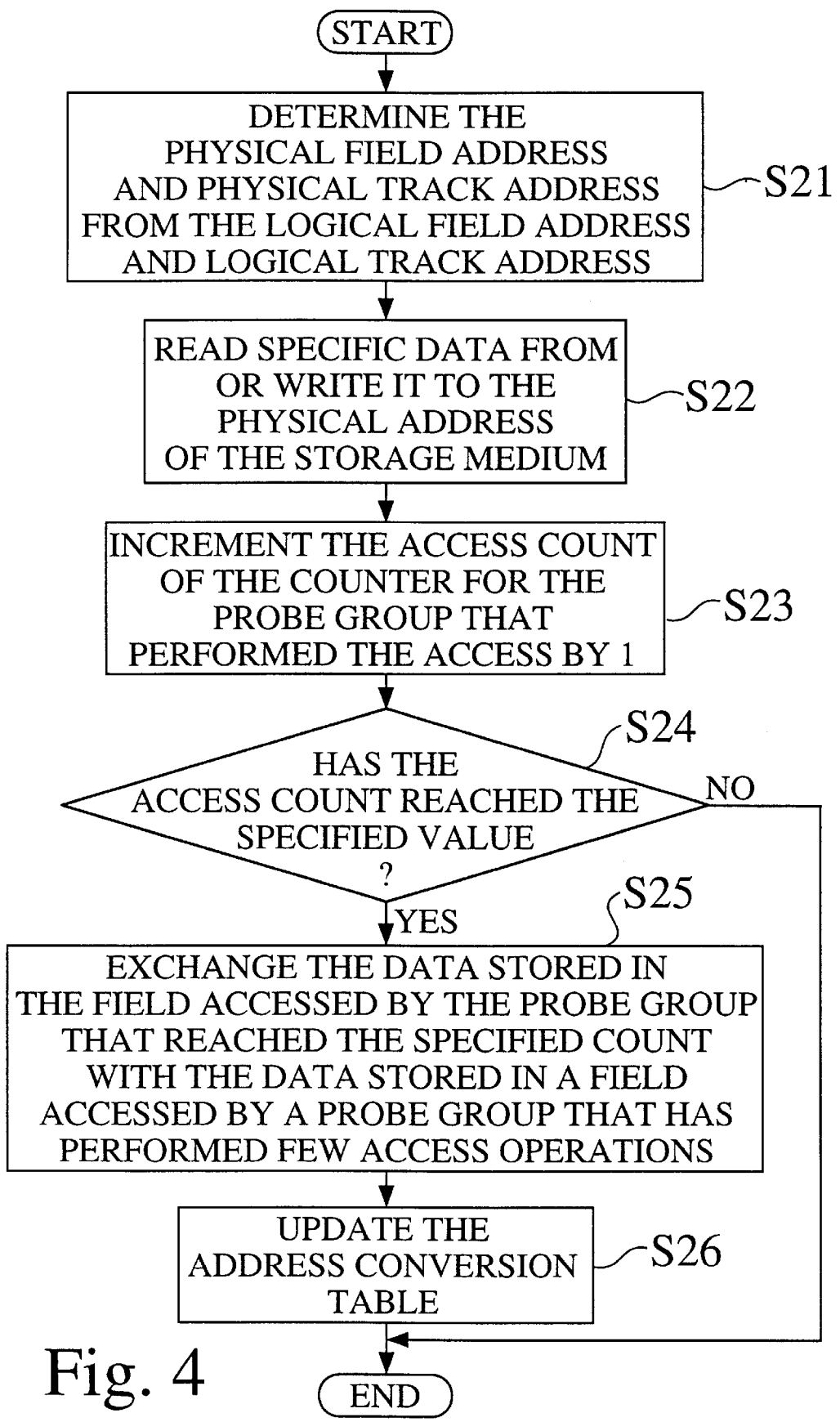
FIG. 4 is a flow chart that shows processing during operation in the first embodiment of the invention.

FIG. 4 is a flow chart that shows the processing performed during normal read/write operation of the first embodiment. This operation will be described using an access to field 21*b* by probe group 31*b* as an example. At the beginning of a normal read/write operation, the data storage system 100 receives from the bus 400 the logical address of the storage area to be accessed on the storage medium 2. As described above, the logical address consists of the logical field address and logical address track address.

In step S21, the address conversion table stored in the memory 42 is accessed to determine the physical field address and the physical track address corresponding to the logical address received via the bus 400.

In step S22, the appropriate probe group performs an access operation on the storage medium at the storage area defined by the physical field address and the physical track address determined in step S21, and data are read from or written to the storage medium. For example, the probe group 31*b* accesses the field 21*b*, as defined by the physical track address, at the track of the field 21*b* defined by the physical track address to read or write data. The physical track address is the same as the logical track address except when a bad track has been replaced by a good spare track, and the physical field address is the same as the logical field address except when a data exchange has been performed between fields.

In step S23, the probe access count counted by the probe access counter 40 corresponding to the probe group 30 that performed the access operation is incremented by one. In the example just described, the probe access count of the probe access counter 41*b* corresponding to the probe group 31*b* is incremented by one. Additionally, the count counted by the total access operations performed counter 44 is incremented by one.

In step S24, the processor 43 determines whether any of the probe access counts counted by the probe access counters 40 has reached a predetermined value, the first threshold. If none of the probe access counts has reached the first threshold, processing ends. Otherwise, execution passes to step S25.

In step S25, the processor 43 executes a data exchange module that exchanges the data stored in the field accessed by the probe group whose access count has reached the first threshold with the data stored in a field accessed by a probe whose access count is below a second threshold. As noted above, the value of the second threshold is less than that of the first threshold. For example, when the probe access count counted by the probe access counter 41*b* for the probe group 31*b* that accesses the field 21*b* reaches the first threshold, the data stored in the field 21*b* are exchanged with the data stored in the field 21*c* accessed by the probe group 31*c*. The probe access count for the probe group 31*c* counted by the probe access counter 41*c* is less than a second threshold, indicating that the probe group 31*c* has performed relatively few access operations. As an alternative to exchanging data with a field accessed by a probe group whose probe access count is less than a second threshold, the data may be exchanged with a field accessed by the probe group having the lowest probe access count.

In step S26, the processor executes an address conversion table rewriting module that updates the field addresses in the address conversion table in the memory 42 to reflect the new physical addresses, namely, the addresses of fields 21c and 21b, of the data originally stored in the fields 21b and 21c, respectively.

The first threshold may be a fixed percentage, for example, 80%, of the preset limit count for access operations, and the second threshold may also be a fixed percentage, for example, 20%, of the limit count. Alternatively, the first threshold can have multiple settings. For example, the first threshold may have three settings that are used consecutively as the total number of access operations increases. The first setting, HA, may be 70% of the limit count; the second setting, HB, may be 80% of the limit count; and the third setting, HC, may be 90% of the limit count.

The second threshold can also have multiple settings. For example, the second threshold may have three settings that are used consecutively as the total number of access operations advances. The first setting, LA, may be 40% of the limit count; the second setting, LB, may be 55% of the limit count; and the third setting, LC, may be 70% of the limit count.

When the number of access operations performed by one of the probe groups 30 reaches the first threshold HA, the data stored in the field accessed by this probe group is exchanged with the data stored in the field accessed by another probe group that has performed fewer access operations than the second threshold LA. When, as a result of repeatedly exchanging data between fields, there are no or few probe groups that have performed fewer access operations than the second threshold LA, data exchanges are then performed with fields accessed by probe groups that have performed fewer access operations than the second threshold LB. Similarly, when there are no or few probe groups that have performed fewer access operations than the second threshold LB, data exchanges are then conducted with fields accessed by probe groups that have performed fewer access operations than the second threshold LC. The processor 43 identifies the probe groups that have performed fewer access operations than the second threshold by referencing the probe access counts counted by the probe access counters 40.

Either or both of the first threshold and the second threshold can be appropriately incremented as the total number of access operations performed increases. When the total number of access operations performed reaches a specific level, the first threshold can be increased from threshold HA to threshold HB, for example, and the second threshold can be increased from threshold LA to threshold LB, for example.

Performance Comparison

Figure 5A:
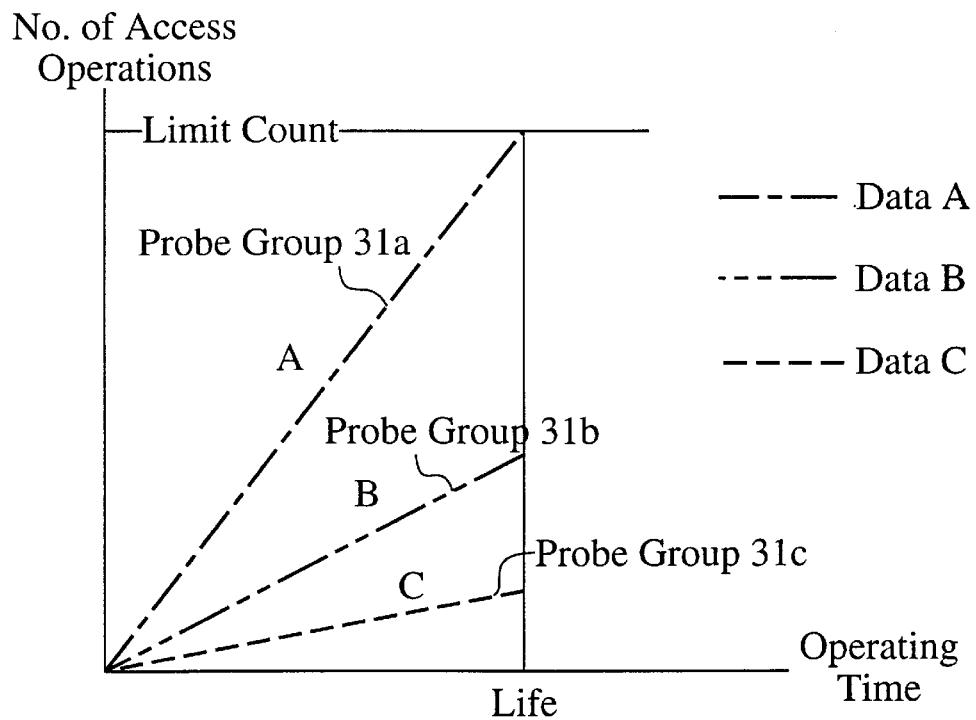
FIG. 5(A) is a graph showing the relationship between the operating time and the number of access operations performed by each probe group in an a conventional scanning-type mass data storage system.
Figure 5B:
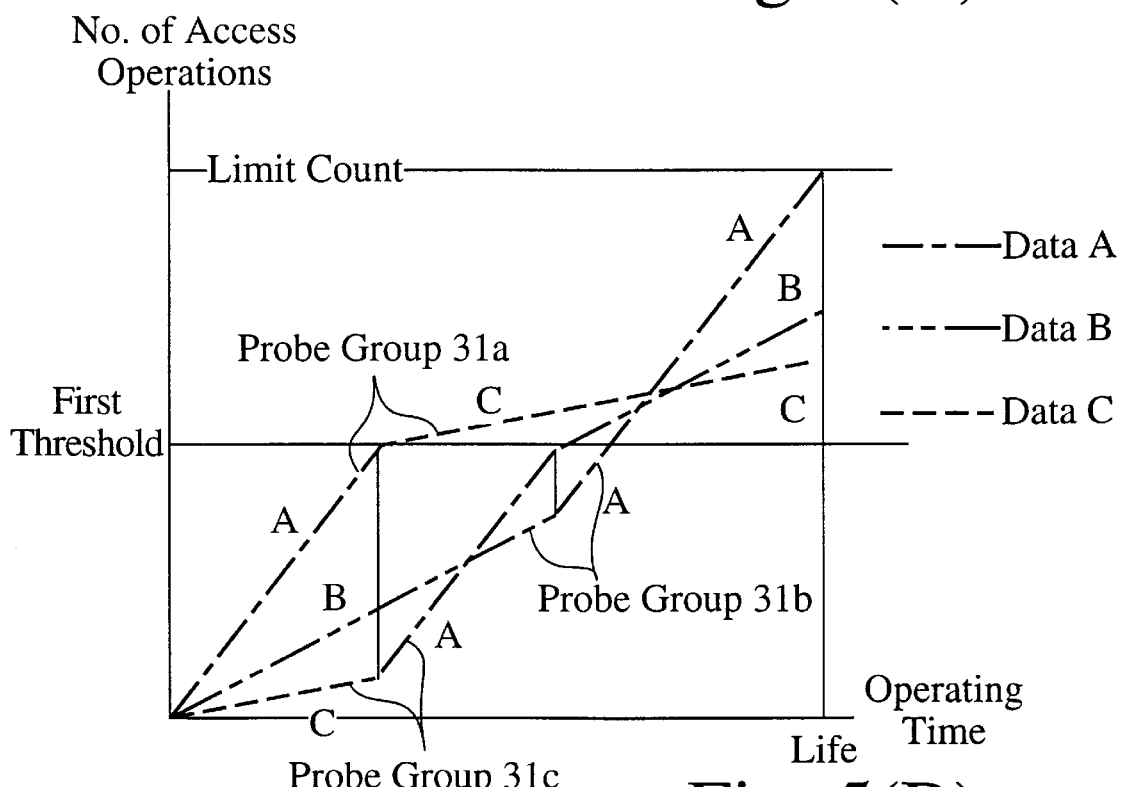
FIG. 5(B) is a graph showing the same relationship in a scanning-type mass data storage system incorporating the first embodiment of the invention.

FIGS. 5(A) and 5(B) are graphs that show the relationship between the operating time of the data storage system, i.e., the total number of access operations performed by the data storage system, and the number of access operations performed by each of the probe groups 31a, 31b, and 31c in both a conventional data storage system and in a data storage system incorporating a first embodiment of the apparatus and method according to the invention. Both data storage systems are simplified in that each has only three probe groups 31a, 31b, and 31c. The data that are read or written by each probe group are A, B, and C, respectively. The numbers of access operations of these data are in the order A, B, and C from highest to lowest. Furthermore, to simplify the explanation, only the first threshold is used. The data stored in a field accessed by a probe group that has performed a number of access operations that reaches the first threshold are exchanged with the data stored in a field accessed by the probe group that has performed the lowest number of access operations.

The useful life of the conventional data storage system shown in FIG. 5(A) is short. The useful life is the time that elapses until the access operations performed by probe group 31a reach the limit count. This is because probe group 31a always performs the largest number of access operations. In contrast, as shown in FIG. 5(B), probe group 31a first performs the access operations of data A. However, when the probe access count of the probe group 31a reaches the first threshold, the data A stored in the field 21a accessed by the probe group 31a are exchanged with the data C stored in the field 21c accessed by probe group 31c. After the exchange, probe group 31c now performs the access operations of data A, and probe group A now performs the access operations of data C. Consequently, probe group A approaches the end of its useful life more slowly than before. Similarly, after the number of access operations performed by probe group 31c reaches the first threshold, another exchange of data is performed, this time between field 21c accessed by probe group 31c and field 21b accessed by probe group 31b. After the data exchange, probe group 31b now performs the access operations of data A. As a result of the data exchanges, the useful life of the data storage system incorporating the apparatus and method according to the invention is markedly extended compared with conventional systems.

In the example just described, because of the large rate at which the access operations of data A are performed, the number of access operations performed by the probe group 31b reaches the limit count before the number of access operations performed by the other two probe groups reach the limit count. When the probe group 31b reaches its limit count, and becomes an invalid probe group that can no longer be used for reading and writing data, the remaining useful life of the other two probe groups is relatively small. The remaining useful life of the other two probe groups would be quickly used up by the number of access operations of data A. To prolong the useful life of the data storage system in this situation, the storage medium 2 may include a number of spare fields (not shown). When the probe access count for the probe group 31b reaches the limit count, the processor 43 transfers the data stored in the field 21b accessed by the probe group 31b to one of the spare fields, and updates the physical field address in the memory 42. The whole useful life of the probe group that accesses the spare field is then available to perform the access operations of data A. Use of the field 21b accessed by the invalid probe group 31b to save data is then discontinued.

The total number of access operations performed by all of the probe groups 30 is counted by the total access operations performed counter 44 to provide a total access operations performed count. If desired, the processor 43 can notify other devices of the total access operations performed count. For example, the total access operations performed count stored in the total access operations performed counter 44 can be communicated to the computer system that uses the mass data storage system for data storage.

The apparatus and method according to the invention prevents problem of the useful life of the mass data storage system 100 ending prematurely as a result of any of the probe groups 30 performing a much larger number of access operations than others of the probe groups because the total number of access operations performed by the mass data storage system 100 is averaged among all of the probe groups 30. Consequently, the total number of access operations that can be performed by all the probe groups 30 determines useful life of the data storage system 100.

The residual life of the data storage system 100 can be indicated to the user on a display. Additionally, a warning indication may be provided on the display, and an audible alert may be sounded to advise the user when the useful life of the data storage system 100 is near its end. The total number of access operations performed by ail the probe groups 30 may be displayed to enable the user to estimate the residual life. The total number of access operations performed can be used for this purpose because the total number of access operations performed is averaged among the probe groups. Alternatively, the residual life of the data storage system may be indicated by displaying the number of valid probe groups remaining as a fraction of all of the probe groups.

Figure 6:
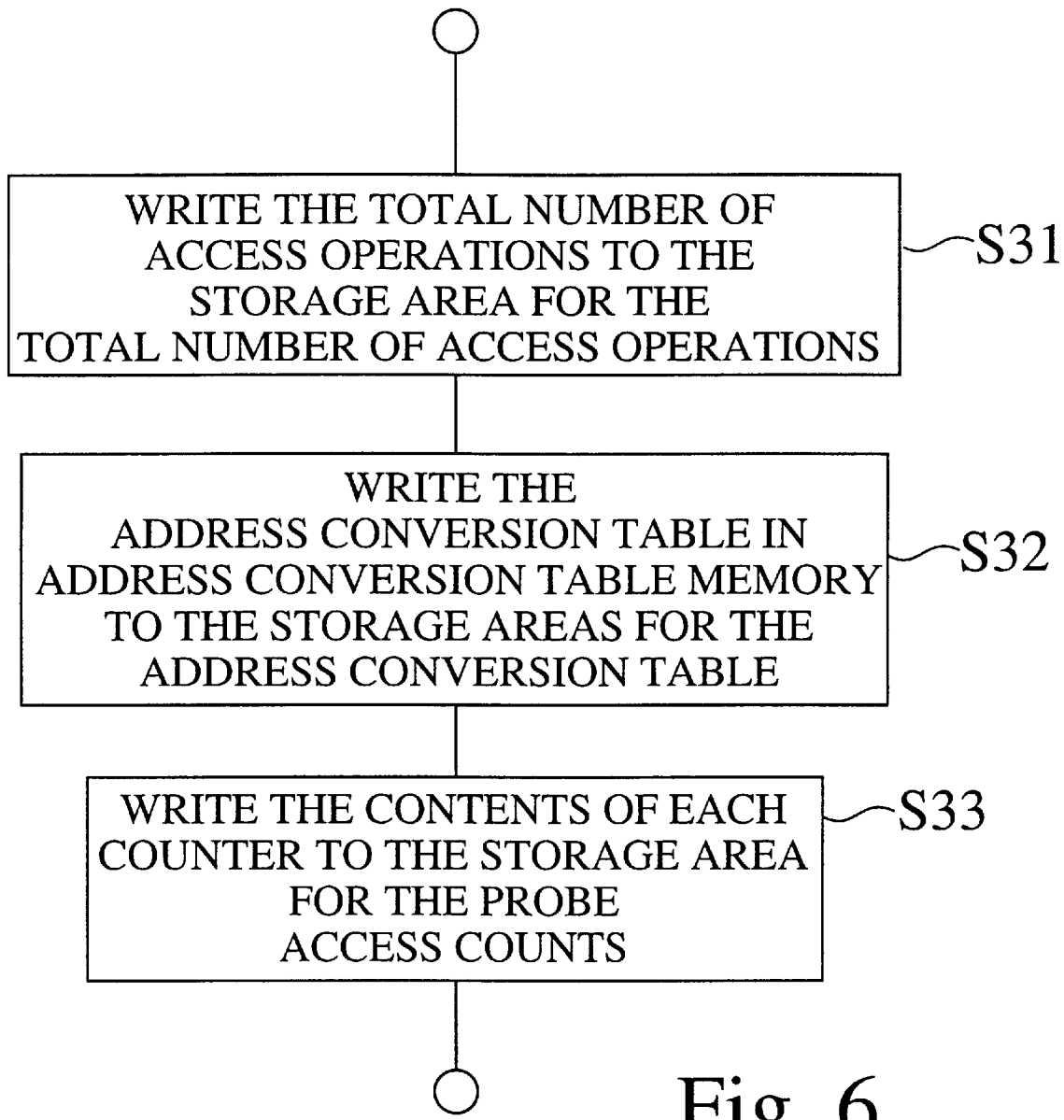
FIG. 6 is a flow chart that shows processing when the power is turned off in the first embodiment of the invention.

FIG. 6 is a flow chart showing the processing performed prior to turning the power off. In step S31, the total access operations performed count counted by the total access operations performed counter 44 is written into the storage area 213. In step S32, the address conversion table stored in the memory 42 is written into the storage area 211 and the storage areas 214. In step S33, the probe access counts counted by the probe access counters 40 are written into the storage area 212. The execution order of the steps is not limited to that shown in FIG. 6.

Second Embodiment

The second embodiment of the apparatus and method according to the invention for extending the useful life of a data storage system will now be described with reference to FIGS. 7 to 10. The second embodiment extends the useful life of the data storage system 100 by considering only wear on the storage medium, and not wear of the probes. Thus, in the second embodiment, only the storage areas are regarded as the components subject to wear.

The structure of the data storage system 100 that incorporates the second embodiment of the invention is the same as that of data storage system described above with reference to FIGS. 1(A) and 1(B), and will not be described again here. As in the first embodiment, the storage medium 2 is divided into storage areas called the fields 70, each of which is accessed by one probe group 30. Each field is subdivided into storage areas called the tracks 80. Each of the tracks is accessed by one probe group 30 in one access operation. All the tracks in each field are accessed by the same probe group 30. As will be described in more detail below, tracks are the storage areas between which data are exchanged in the second embodiment.

Figure 7:
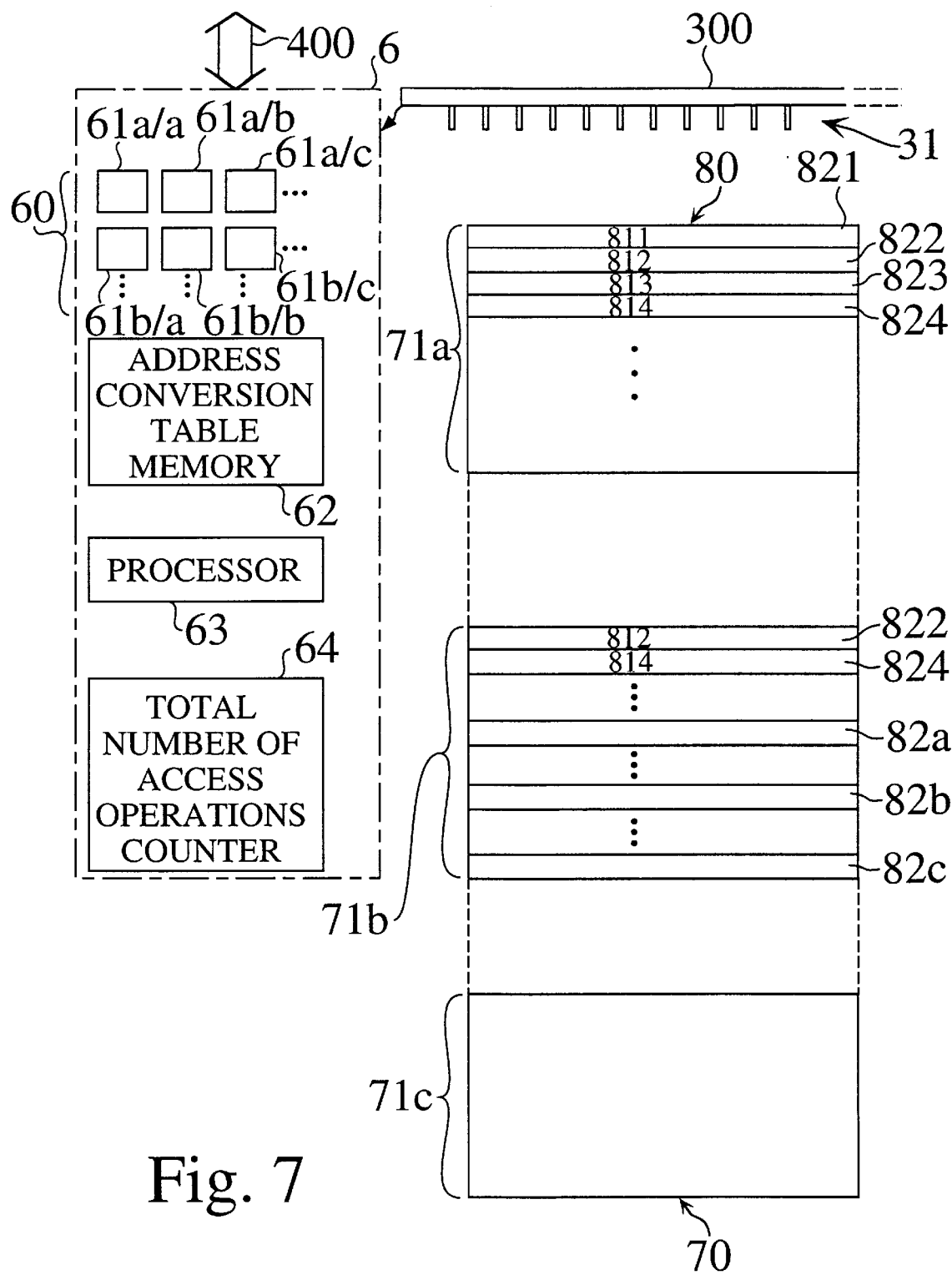
FIG. 7 shows the typical relationship between the probe group and semiconductor circuit with each field and track in a second embodiment of the invention.

FIG. 7 shows the preferred arrangement of the semiconductor circuit 6 embodying the second embodiment of the invention, with the probe groups 30, fields 70, and tracks 80 of the data storage system 100. In this embodiment, the semiconductor circuit 6 includes the received access counters 60 that count the number of access operations received by each of the tracks 80 to generate a received access count for each track, the memory 62 for the address conversion table, the processor 63, and the total access operations received counter 64 that counts the total number of access operations received to generate a total access operations received count. Similar to the first embodiment, the total access operations received counter 64 can be omitted.

The processor 63 performs three main processing operations:

(1) Identifying the tracks that have received many access operations compared with average tracks and identifying the tracks that have received few access operations compared with average tracks;

(2) Exchanging the data stored in a track that has received many access operations with the data stored in a track that has received few access operations; and (3) Rewriting the address conversion table to assign the physical addresses of the tracks after the data exchange to logical addresses that correspond to the physical addresses of the tracks before the data exchange.

Because the useful life of the device 100 is limited only by wear of the storage medium, the processor 63 only has to monitor the number of access operations received by each track of the storage medium 2. When the power is turned off, the received access counts indicating the number of access operations received by each track in each field are transferred from the received access counters 60 for the field to the storage area 812 provided in the specific track 822 of the field. For example, the received access count counted by the received access counters 61a/a, 61a/b, 61a/c, . . . indicating the number of access operations received by each track in the field 71a are transferred from the counters 61a/a, 61a/b, 61a/c, . . . to the storage area 812 provided in the specific track 822 of the field 71a. When the power is turned back on, the received access counts are read back into the respective received access counters 60 provided in the semiconductor circuit 6.

The storage area 811 for the field address conversion table and the storage area 813 for the total access operations received count are preferably provided in the field 71a having the lowest physical address. The storage area 811 is provided in the track 821, and the storage area 813 is provided in the track 823. The storage area 814 for the track address conversion table is provided in the specific track 824 in each field. The field address conversion table stored in the storage area 811 and the track address conversion table stored in the storage area 814 collectively constitute the address conversion table. The field address conversion table and the track address conversion table are also stored in the memory 62. When access operations are performed in the course of reading data from and writing data to the storage medium 2, the address conversion table stored in the memory 62 is referenced. In a post-manufacture initialization operation similar to that described above, the received access count for each track and the data indicating the total access operations received for the data storage system 100 as a whole are both set to zero.

Data Read/Write Operation

Figure 8:
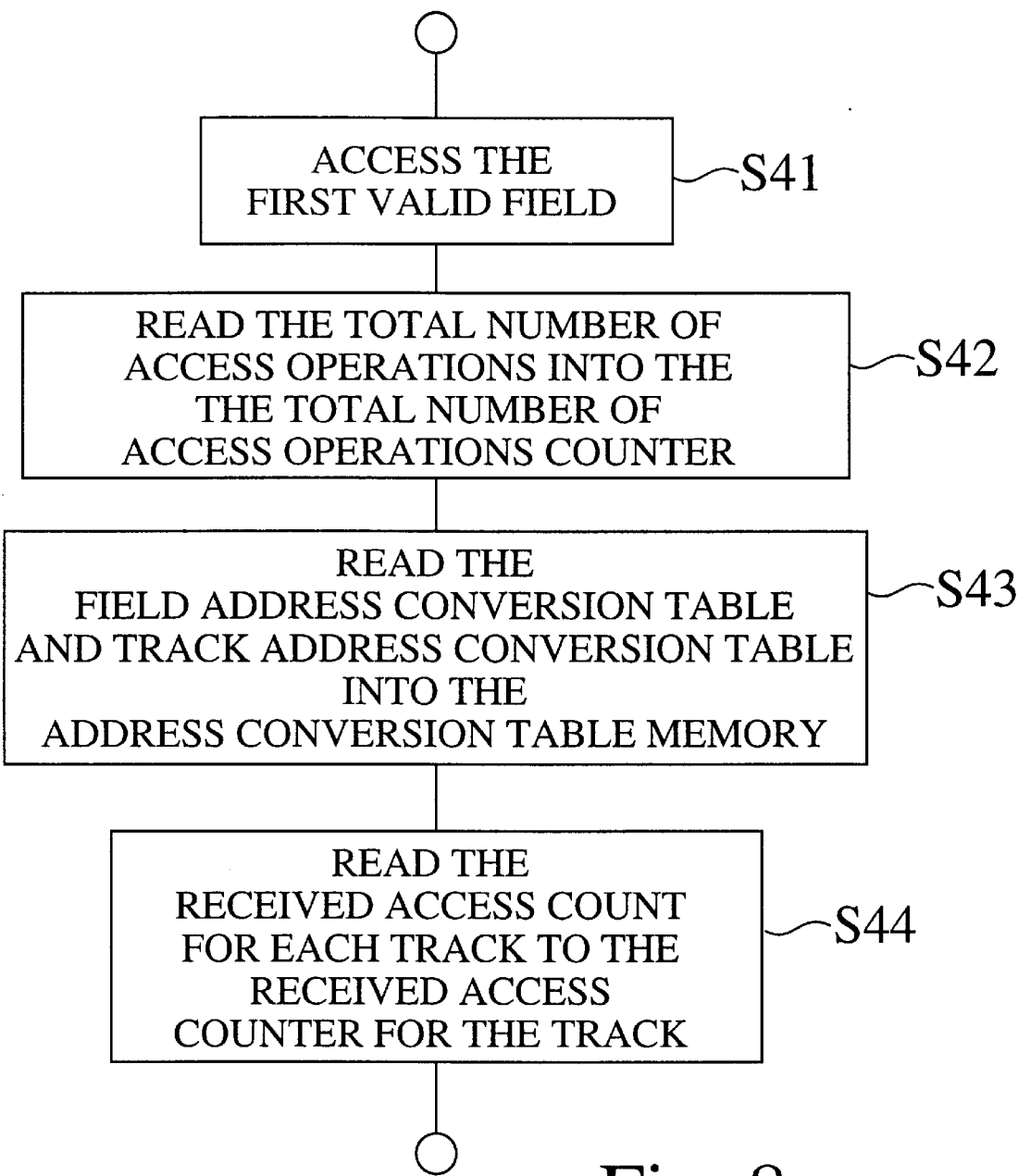
FIG. 8 is a flow chart that shows processing when the power is turned on in the second embodiment of the invention.

FIG. 8 shows the flow chart that illustrates the processing performed by the processor 63 when the power is turned on. The steps S41 to S43 are similar to steps S11 to S14 shown in FIG. 3 for the first embodiment, and will therefore not be described again in detail here.

In the second embodiment, the fields 70 correspond to the fields 20 in the first embodiment. Similarly, storage area 811 corresponds to the storage area 211. The storage area 812 corresponds to the storage area 212 The storage area 813 corresponds to the storage area 213. The storage area 814 corresponds to the storage area 214. The received access counters 60 correspond to the prove access counters 40. The memory 62 corresponds to the memory 42. The total access operations received counter 64 corresponds to total access operations performed counter 44.

Figure 9:
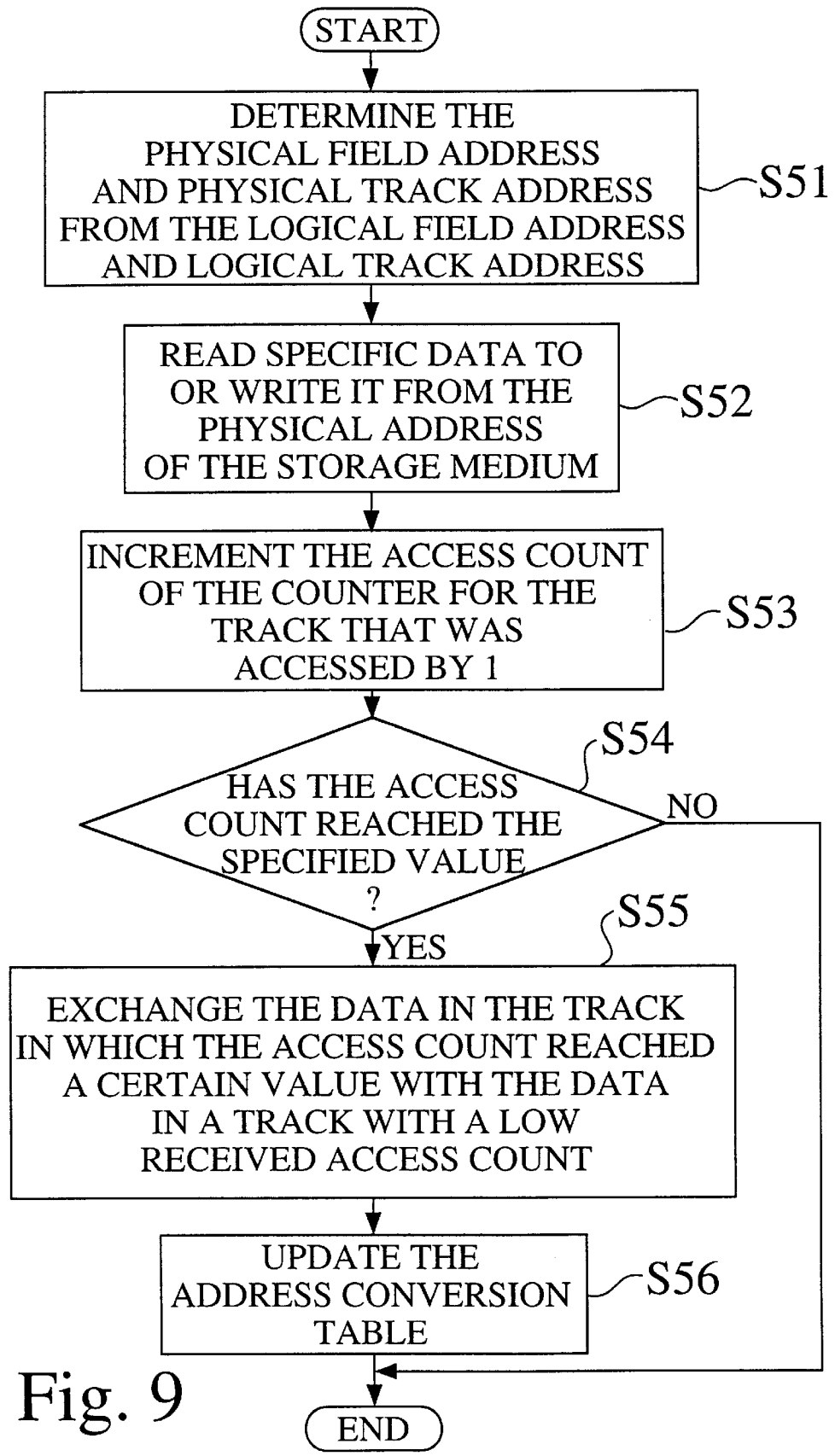
FIG. 9 is a flow chart that shows processing during operation in the second embodiment of the invention.

The processing performed during a normal access operation for reading data from or writing data to the storage medium 2 will now be described with reference to FIG. 9. This operation will be described using an access to track 82a in the field 71b shown in FIG. 7 as an example. At the start of such processing, the data storage system 100 receives from the bus 400 the logical address defining the location in the storage medium 2 to be accessed. As described above, the logical address consists of a logical field address and a logical track address.

In step S51, the address conversion table stored in the memory 62 is referenced to determine the physical field address and physical track address from the logical field address and logical track address.

In step S52, an access operation is performed, and data are read or written at the storage location defined by the physical field address and the physical track address determined at step S51.

In step S53, the received access count counted by the received access counter 60 corresponding to the track that received the access operation is incremented by one. In the example just described, the received access count counted by the received access counter 61b/a for the accessed track 82a in the field 71b is incremented by one. The value of total access operations received count counted by the total access operations received counter 64 is also incremented by one.

In step S54, the processor 63 determines whether the received access count counted by any of the received access counters 60 has reached a predetermined value, the first threshold. If none of the received access counts has reached the threshold value, processing ends. Otherwise, execution passes to step S55.

In step S55, the processor 63 executes the data exchange module that exchanges the data stored in the track whose received access count has reached the first threshold with the data stored in a track whose received access count is below a second threshold. As noted above, the value of the second threshold is less than that of the first threshold. For example, when the received access count counted by the counter 61b/a for the track 82a in field 71b has reached the first threshold, the data stored in the track 82a are exchanged with the data stored in the track 82b. The received access count for the track 82b counted by the counter 61b/b is less than a second threshold, indicating that the track 82b has received relatively few access operations.

In step S56, the processor 63 executes the address conversion table write module that updates the track addresses in the address conversion table in the memory 62 to reflect the new physical addresses, namely, the addresses of tracks 82b and 82a, of the data originally stored in the tracks 82a and 82b, respectively.

The first threshold and the second threshold can be determined in the same way as the first threshold and the second threshold in the first embodiment, so an explanation of this determination is omitted here. Moreover, the first threshold and the second threshold can have progressively-changing values, as described above. Alternatively, a second threshold need not be determined, and the data exchange operation may be performed with the track having the lowest number of received access operations. Such track is identified by referring to the received access counts counted by the received access counters 60.

The way in which data exchange is performed may take into account the wear resistance of the storage medium and the capacity of the semiconductor memory occupied by the address conversion table. The memory capacity required to accommodate the address conversion table can be significantly reduced by performing the data exchange in units composed of several tracks, or by performing data exchange between tracks that are physically close to one another.

Spare tracks may be provided in each field and may be used in a manner similar to the spare fields described above with reference to the first embodiment to further extend the useful life of the mass data storage device 100. The useful life may be further extended by providing and using spare fields in the manner described above. FIG. 7 shows the spare track 82c as an example of the spare tracks that may be provided in the field 71b. FIG. 7 also shows the spare field 71c as an example of the spare fields that may be provided in the storage medium 2.

The second embodiment of the invention prevents the problem of the useful life of the mass data storage system 100 being prematurely ended as a result of any of the tracks receiving a much greater number of access operations than others of the tracks because the total number of access operations received at all of the tracks is averaged among the tracks. Consequently, the total number of received access operations received by the whole of the storage medium 2 is what determines the residual life of the data storage system 100.

Data indicating the total number of access operations received by all of the tracks in the storage medium 2 are counted by the total access operations received counter 64 to generate a total access operations received count. The total access operations received count can be communicated from the total access operations received counter 64 to other devices, such as the computer system (not shown) for which the data storage system 100 stores data. Since the value of the total access operations received count indicates the total number of access operations received by all the tracks of the storage medium, a display of this count can inform the user about the residual life of the data storage system 100.

Figure 10:
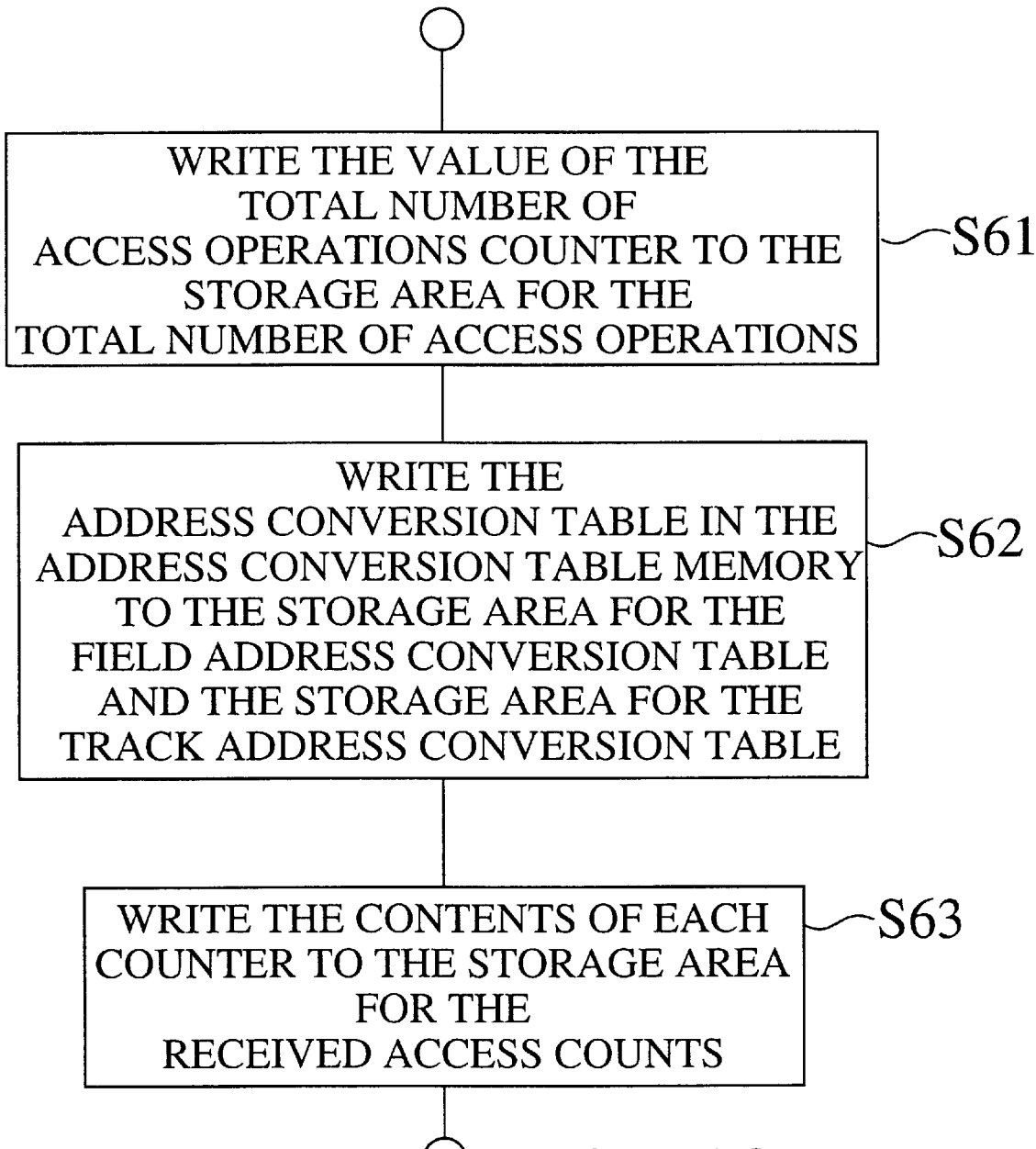
FIG. 10 is a flow chart that shows processing when the power is turned off in the second embodiment of the invention.

When the power is turned off, steps similar to those performed by the first embodiment are executed. For reference, FIG. 10 shows a flow chart in which steps S61 to S63 correspond to steps S31 to S33 described above with reference to FIG. 6. Steps S61 to S63 will not be described further.

When the power is turned on, the track address conversion table is read into the memory 62. During execution of the address conversion table write module described above, the memory 62 is referenced. Moreover, during normal access operations, the number of access operations received by each track is counted by the received access counter 60 corresponding to the track.

The data exchange operation is preferably performed between tracks within the same field. However, the second embodiment is not so limited, but can also perform the data exchange operation between tracks located in different fields.

Finally, the first and second embodiments can be combined to take account of wear in both the storage medium and the probe groups.

Although the apparatus and method according to the invention for extending the useful life of a data storage system are described in connection with a scanning-type mass data storage system, the invention may be applied to any of a wide variety of storage devices that have components subject to wear. Thus, while the invention has been described in detail with reference to a particular preferred embodiment, persons possessing ordinary skill in the art to which this invention pertains will appreciate that various modifications and enhancements may be made without departing from the scope of the invention as defined by the following claims.

We claim:

1. Apparatus for extending the useful life of a data storage system having components subject to wear, the components subject to wear being read/write members and storage areas of a storage medium, data being read and written in the storage medium by the read/write members performing access operations on respective storage areas, the access operations imposing wear on the components subject to wear, the apparatus comprising:

a memory in which is stored an address correction table that assigns physical addresses of the storage areas to logical addresses;

a counter that registers an access count for each of the components subject to wear;

data exchange means, operating in response to the access count for one of the components subject to wear reaching a first threshold value, for performing a data exchange operation in which data stored in a first storage area are exchanged with data stored in a second storage area, the first storage area being the one of the storage areas having the access count that reached the first threshold value and the second storage area being one of the storage areas having an access count less than the first threshold value when the components subject to wear are the storage areas, the first storage area being the one of the storage areas accessed by the one of the read/write members having the access count that reached the first threshold value and the second storage area being one of the storage areas accessed by another of the read/write members having an access count less than the first threshold value when the components subject to wear are the read/write members;

means, operating after each data exchange operation, for rewriting part of the address correction table to assign the physical addresses of the second and first storage areas after the data exchange operation to logical addresses that correspond to the physical addresses of the first and second storage areas, respectively, before the data exchange operation, and means, operating in response to the counter, for identifying ones of the components subject to wear having an access count less than a second threshold value, the second threshold value being less than the first threshold value; in which, the second storage area on which the data exchange means performs the data exchange operation is one of the storage areas having the access count less than the second threshold value when the components subject to wear are the storage areas and is the one of the storage areas accessed by one of the read/write members having the access count less than the second threshold value when the components subject to wear are the read/write members.

2. The apparatus of claim 1, in which:

the components subject to wear are the storage areas; and the storage areas are tracks of the storage medium, each of the tracks being a portion of the storage medium accessed by one of the read/write members in a single access operation.

3. The apparatus of claim 1, in which:

the component subject to wear are the read/write members; and the storage areas are fields of the storage medium, each of the fields being a portion of the storage medium accessed by one of the read/write members.

4. The apparatus of claim 1, in which the data exchange means includes threshold increasing means for progressively increasing the second threshold value.

5. The apparatus of claim 4, in which:

the apparatus additionally comprises total access operations counting means for counting a total number of access operations for all of the components subject to wear; and the threshold increasing means operates in response to the total number of access operations counted by the total access operations counting means.

6. The apparatus of claim 5, in which:

the components subject to wear are the storage areas; and the storage areas are tracks of the storage medium, each of the tracks being a portion of the storage medium accessed by one of the read/write members in a single access operation.

7. The apparatus of claim 5, in which:

the component subject to wear are the read/write members; and the storage areas are fields of the storage medium, each of the fields being a portion of the storage medium accessed by one of the read/write members.

8. The apparatus of claim 4, in which:

the components subject to wear are the storage areas; and the storage areas are tracks of the storage medium, each of the tracks being a portion of the storage medium accessed by one of the read/write members in a single access operation.

9. The apparatus of claim 4, in which:

the component subject to wear are the read/write members; and the storage areas are fields of the storage medium, each of the fields being a portion of the storage medium accessed by one of the read/write members.

10. The apparatus of claim 4, in which the data exchange means is additionally for performing the data exchange operation with a spare storage area when the access count of one of the components subject to wear reaches a limit count.

11. The apparatus of claim 1, in which the data exchange means includes threshold increasing means for progressively increasing the first threshold value.

12. The apparatus of claim 11, in which:

the apparatus additionally comprises total access operations counting means for counting a total number of access operations for all of the components subject to wear; and the threshold increasing means operates in response to the total number of access operations counted by the total access operations counting means.

13. The apparatus of claim 1, in which the data exchange means is additionally for performing the data exchange operation with a spare storage area when the access count of one of the components subject to wear reaches a limit count.

14. A method for extending the useful life of a data storage system having components subject to wear, the components subject to wear being read/write members and storage areas of a storage medium, data being read and written in the storage medium by the read/write members performing access operations on respective storage areas, the access operations imposing wear on the components subject to wear, the method comprising steps of:

providing an address correction table that assigns physical addresses of the storage areas to logical addresses;

counting an access count for each of the components subject to wear;

in response to the access count for one of the components subject to wear reaching a first threshold value, performing a data exchange operation in which data stored in a first storage area are exchanged with data stored in a second storage area, the first storage area being the one of the storage areas having the access count that reached the first threshold value and the second storage area being one of the storage areas having an access count less than the first threshold value when the components subject to wear are the storage areas, the first storage area being the one of the storage areas accessed by the one of the read/write members having the access count that reached the first threshold value and the second storage area being one of the storage areas accessed by another of the read/write members having an access count less than the first threshold value when the components subject to wear are the read/write members;

after each data exchange operation, rewriting part of the address correction table to assign the physical addresses of the second and first storage areas after the data exchange operation to logical addresses that correspond to the physical addresses of the first and second storage areas, respectively, before the data exchange operation; and identifying ones of the components subject to wear having an access count less than a second threshold value, the second threshold value being less than the first threshold value; in which, in the step of performing the data exchange operation, the second storage area on which the data exchange operation is performed is one of the storage areas identified in the identifying step, as having the access count less than the second threshold value when the components subject to wear are the storage areas, and is the one of the storage areas accessed by one of the read/write members identified in the identifying step as having the access count less than the second threshold value when the components subject to wear are the read/write members.

15. The method of claim 14, additionally comprising steps of:

counting a total number of access operations for all of the components subject to wear; and increasing the second threshold value in response to the total number of access operations counted in the total access operations counting step.

16. The method of claim 14, in which:

the components subject to wear are the storage areas; and the storage areas are tracks of the storage medium, each of the tracks being a portion of the storage medium accessed by one of the read/write members in a single access operation.

17. The method of claim 16, additionally comprising steps of:

counting a total number of access operations for all of the components subject to wear; and increasing the second threshold value in response to the total number of access operations counted in the total access operations counting step.

18. The method of claim 14, in which:

the components subject to wear are the read/write members; and the storage areas are fields of the storage medium, each of the fields being a portion of the storage medium accessed by one of the read/write members.

19. The method of claim 18, additionally comprising steps of:

counting a total number of access operations for all of the components subject to wear; and increasing the second threshold value in response to the total number of access operations counted in the total access operations counting step.

* * * * *